US010087979B2

(12) United States Patent
Shippy et al.

(10) Patent No.: US 10,087,979 B2
(45) Date of Patent: *Oct. 2, 2018

(54) COMPOSITE TUBE FOR TORQUE AND/OR LOAD TRANSMISSIONS AND RELATED METHODS

(71) Applicant: CCDI Composites Inc., Santa Ana, CA (US)

(72) Inventors: Jack A. Shippy, Brea, CA (US); Bruce Blank, Mission Viejo, CA (US)

(73) Assignee: CCDI Composites Inc., Santa Ana, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/341,674

(22) Filed: Nov. 2, 2016

(65) Prior Publication Data

US 2017/0074314 A1    Mar. 16, 2017

Related U.S. Application Data

(63) Continuation of application No. 14/173,257, filed on Feb. 5, 2014, now Pat. No. 9,518,601.
(Continued)

(51) Int. Cl.
*B60K 17/24* (2006.01)
*F16C 3/02* (2006.01)
*F16D 1/068* (2006.01)

(52) U.S. Cl.
CPC ............... *F16C 3/02* (2013.01); *F16C 3/026* (2013.01); *F16D 1/068* (2013.01)

(58) Field of Classification Search
CPC ........ F16C 3/02; F16C 3/026; F16C 2326/06; B29C 65/64; B29C 65/562; B21B 15/00; Y10S 24/28
(Continued)

(56) References Cited

U.S. PATENT DOCUMENTS 4,248,062 A    2/1981    McLain et al.
4,265,951 A    5/1981    Yates et al.
(Continued)

FOREIGN PATENT DOCUMENTS

DE    3740754 A1    6/1989
EP    0537035 A1    4/1993

OTHER PUBLICATIONS

Non-Final Office Action on related (U.S. Appl. No. 14/173,257) dated Jan. 29, 2016.

*Primary Examiner* — Toan C To
(74) *Attorney, Agent, or Firm* — Klein, O'Neill & Singh, LLP (57) ABSTRACT

A composite tube made from a combination fiber and epoxy is disclosed. The tube may be made by filament winding although other materials and processes are suitable. In one example, the tube laminate is a mix of axial and helical fibers tailored to meet the stiffness and strength requirements of the particular application. Fibers having a different modulus may also be mixed to meet axial and torsional stiffness requirements. For example, high modulus fibers may be used in a helical pattern to handle high torque loads while lower modulus fibers may be used for the remaining portion of the tube laminate. The composite tube may be used for load and/or torque bearing applications and can include a support tube pressed fit into an end of the tube.

19 Claims, 5 Drawing Sheets

Related U.S. Application Data (60) Provisional application No. 61/760,797, filed on Feb. 5, 2013.

(58) Field of Classification Search
USPC ........ 180/380; 29/469.5, 506, 507, 508, 510
See application file for complete search history.

(56) References Cited

U.S. PATENT DOCUMENTS

| | | |
|---|---|---|
| 4,451,245 A | 5/1984 | Hörnig et al. |
| 4,551,116 A | 11/1985 | Krude |
| 4,713,040 A | 12/1987 | Beigang et al. |
| 4,715,739 A | 12/1987 | Rüegg et al. |
| 4,747,806 A | 5/1988 | Krude et al. |
| 4,773,891 A | 9/1988 | Hoffmann |
| 4,834,932 A | 5/1989 | Salzman et al. |
| 4,932,924 A | 6/1990 | Löbel |
| 5,087,147 A | 2/1992 | Petrzelka et al. |
| 5,118,214 A | 6/1992 | Petrzelka et al. |
| 5,253,947 A | 10/1993 | Petrzelka et al. |
| 5,320,579 A | 6/1994 | Hoffmann |
| 5,474,630 A | 12/1995 | Rouillot |
| 5,553,964 A | 9/1996 | Rouillot |
| 5,836,825 A | 11/1998 | Yamane |
| 6,484,384 B1 | 11/2002 | Gibson et al. |
| 7,025,686 B1 | 4/2006 | Aiken |
| 7,062,835 B2 | 6/2006 | Sugiyama et al. |
| 7,143,510 B2 | 12/2006 | Myers et al. |
| 8,161,619 B2 | 4/2012 | Wanthal |
| 8,365,502 B2 | 2/2013 | Allen et al. |
| 8,597,131 B2 | 12/2013 | Pisinger |
| 8,777,761 B2 | 7/2014 | Genway-Hayden et al. |
| 9,028,164 B2 * | 5/2015 | Yablochnikov .......... F16D 1/068 403/359.1 |
| 9,518,601 B2 * | 12/2016 | Shippy .................... F16C 3/026 |
| 9,592,657 B1 * | 3/2017 | Hultgren ............. B32B 38/0012 |
| 9,777,713 B2 * | 10/2017 | Sato ........................ F03D 13/10 |
| 2002/0032065 A1 * | 3/2002 | Suzuki .................... F16C 3/026 464/181 |
| 2003/0125117 A1 * | 7/2003 | Burkett .................. F16C 3/026 464/181 |
| 2004/0012198 A1 * | 1/2004 | Brotzell .................. E21B 17/02 285/249 |
| 2005/0199308 A1 * | 9/2005 | Swails .................. F16L 11/088 138/109 |
| 2009/0116898 A1 * | 5/2009 | Wanthal .................... B64C 1/06 403/179 |
| 2015/0119153 A1 * | 4/2015 | Ley ........................ B21D 39/04 464/180 |

\* cited by examiner

COMPOSITE TUBE FOR TORQUE AND/OR LOAD TRANSMISSIONS AND RELATED METHODS

BACKGROUND

Engineers in general and automotive engineers in particular continuously strive for weight reduction in vehicles without compromising strength, reliability and crash worthiness. Composite materials, such as carbon fiber/epoxy composites, can provide the weight reduction and strength required by engineers. However, the connection of a composite material component to a traditional metallic automotive component can be problematic. This is particularly the case when composite material needs to be attached to traditional drive-line components, such as the engine bell housing, the transaxle, the transmission, or the differential gear unit, as non-limiting examples.

Front engine automobiles having a rear transaxle are attractive to automotive engineers because of the more equal weight distribution between the front and rear tires. Traditionally, the transaxle design uses the auto frame to hold the relative position of the engine to the transaxle and react torque loads. A drive shaft provides the power transmission between the engine and the transaxle.

A structural tube, also known as a torque tube, is typically provided between the engine and the transaxle and concentric around the drive shaft to provide a direct tie for the two components. The drive shaft runs through this structural tube. The structural tube must resist bending and torque loads between the engine and the transaxle. A carbon fiber composite tube is ideal for this application because of its lightweight, strength and dampening characteristics. A carbon fiber composite structural tube can be efficiently made by the filament winding process. The carbon fibers can be tailored in their orientation and thickness to meet the bending and torsional stiffness and strength requirements for such an application. While designing and manufacturing a carbon fiber/epoxy structural tube for the engine/transaxle torque tube application is relatively easy, the joint between the engine bell housing and the transaxle nose housing and the carbon fiber composite torque tube can be problematic.

Fasteners are often used to tie metallic and composite structural components together. However, fasteners add cost and are not attractive for high volume automotive applications. Welding components together is cost effective and typical for the auto industry but is not possible for composites. Adhesive bonded joints may be used but typically require external fixtures to hold the assemblies, such as to hold the engine/transaxle torque tube assembly, while the adhesive cures, which can be too slow for high volume automotive production.

Interference "press fit" joints are common for the automotive industry but may not be suitable for composites. If a carbon fiber/epoxy tube was "pressed fit" into or has a "press-fit" arrangement or joint with aluminum or steel bell housing for the engine/transaxle torque tube application, the composite could creep when subjected to under the hood and road temperatures. This in turn can compromise the interference fit and lead to separation. If adhesive was applied to a carbon fiber tube and it was slipped fit into the engine or transaxle housing, the adhesive would be scraped-off during installation and the strength of the bond could be compromised and highly variable.

SUMMARY

Aspects of the present system and device include a drive train for a vehicle comprising an engine component housing comprising a hub having an inside diameter defining a bore. For example, the engine component housing can be a bell housing, a transmission housing, or a transaxle housing of an automobile, truck, or recreational vehicle. The drive train can further comprise a composite tube comprising an outer diameter positioned within the bore of the hub of the engine component housing with said composite tube comprising a bore comprising an inner diameter. To resist and/or prevent creep, a support tube is located inside the bore of the composite tube. Preferably, the support tube and the composite tube are in an interference fit and preferably the hub of the engine component housing and the composite torque tube are in an interference fit. In an example, adhesive bond is applied to bond the composite tube and the engine component together.

The drive train wherein the support tube is made from a metallic material, such as from aluminum, is disclosed.

The drive train can further comprise a hole formed in the hub of the engine component housing and wherein a fitting is connected to the hole to permit adhesive application into the connection joint.

The drive train can further comprise undercut formed in the bore of the hub of the engine component housing or the composite tube.

The drive train wherein the composite tube has a second end and wherein a second support tube is pressed fit into the second end.

The drive train wherein a portion of the composite tube that is positioned within the bore of the hub of the engine component housing can have a clean-up machined surface.

The drive train wherein the support tube has an end most part and the composite tube has an end most part and wherein the two end most parts can align.

The drive train can further comprise a drive shaft located inside the composite tube and within the support tube.

The drive train wherein the engine component housing is a bell housing or a slip-on yoke.

Another aspect of the present device and system comprises a shaft piece comprising a metallic sleeve pressed fit into a composite tube with an interference fit such that when the composite tube is subsequently pressed fit into a metallic hub, the composite tube is sandwiched between two metallic interfaces with an interference pre-load on an inside surface of the composite tube and on an outside surface of the composite tube.

The shaft piece wherein the metallic hub is connected to a flange comprising a bolt pattern is disclosed.

The shaft piece wherein the metallic hub is part of a slip-on yoke comprising at least two connecting bosses is disclosed.

The shaft piece wherein the metallic hub is part of a bell housing of an automobile drive train is disclosed.

The shaft piece wherein the metallic hub is part of a gear box is disclosed.

The shaft piece wherein the metallic hub is connected to a flange, which is connected to a fan assembly, is disclosed.

A still further feature of the present device and system is a mechanical joint for an automotive driveline assembly connecting an engine and a transaxle, said mechanical joint comprising adhesive injected into a relief space machined in a press-fit joint of a composite tube and a metallic hub so that assembly between the composite tube and the metallic hub is self-fixturing while the adhesive cures.

Yet another aspect of the present disclosure is a method for forming a shaft piece. The method can comprise forming a composite tube comprising a first end and a second end; said first end comprising a bore, an exterior surface, and an interior surface. The method further comprises the steps of placing a support tube into the bore of the first end in a press-fit arrangement and placing the composite tube with the support tube into a bore of a metallic structure in a press-fit arrangement with the metallic structure.

The method can further comprise machining an undercut in the bore of the metallic structure prior to placing the composite tube therein or an undercut on the OD of the composite tube.

The method can further comprise pressuring adhesive through a hole formed in the bore of the metallic structure.

The method wherein the shaft piece is usable in a cooling tower application or an automotive application.

The method can further comprise placing a metallic support tube into the composite tube at the second end.

The method can further comprise aligning an end most part of the support tube with an end most part of the first end.

Still yet another aspect of the present disclosure is a drive train for a vehicle. The drive train can comprise an engine component housing comprising a hub having an inside diameter defining a bore, an outside diameter, and a thickness therebetween; a composite tube comprising an outer diameter and an inner diameter pressed fit with the hub of the engine component housing, said composite tube comprising a bore; a support tube mounted inside the bore of the composite tube or over the outer diameter of the composite tube in an interference; and wherein the hub of the engine component housing and the composite torque tube are adhesively bonded together.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of composite tube for torque and/or load transmissions provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

In an exemplary embodiment of the present device, system, and method, an elongated composite tube is provided, which is preferably made from a combination of fiber and epoxy and is capable of load and/or torque bearing. The tube may be made by filament winding although other materials and processes are also suitable. In one example, the tube laminate is a mix of axial and helical fibers tailored to meet the stiffness and strength requirements of the particular automobile. Fibers having a different modulus may also be mixed to meet axial and torsional stiffness requirements. For example, high modulus fibers may be used in a helical pattern to handle high torque loads while lower modulus (and lower cost) fibers may be used for the remaining portion of the tube laminate.

Figure 1:
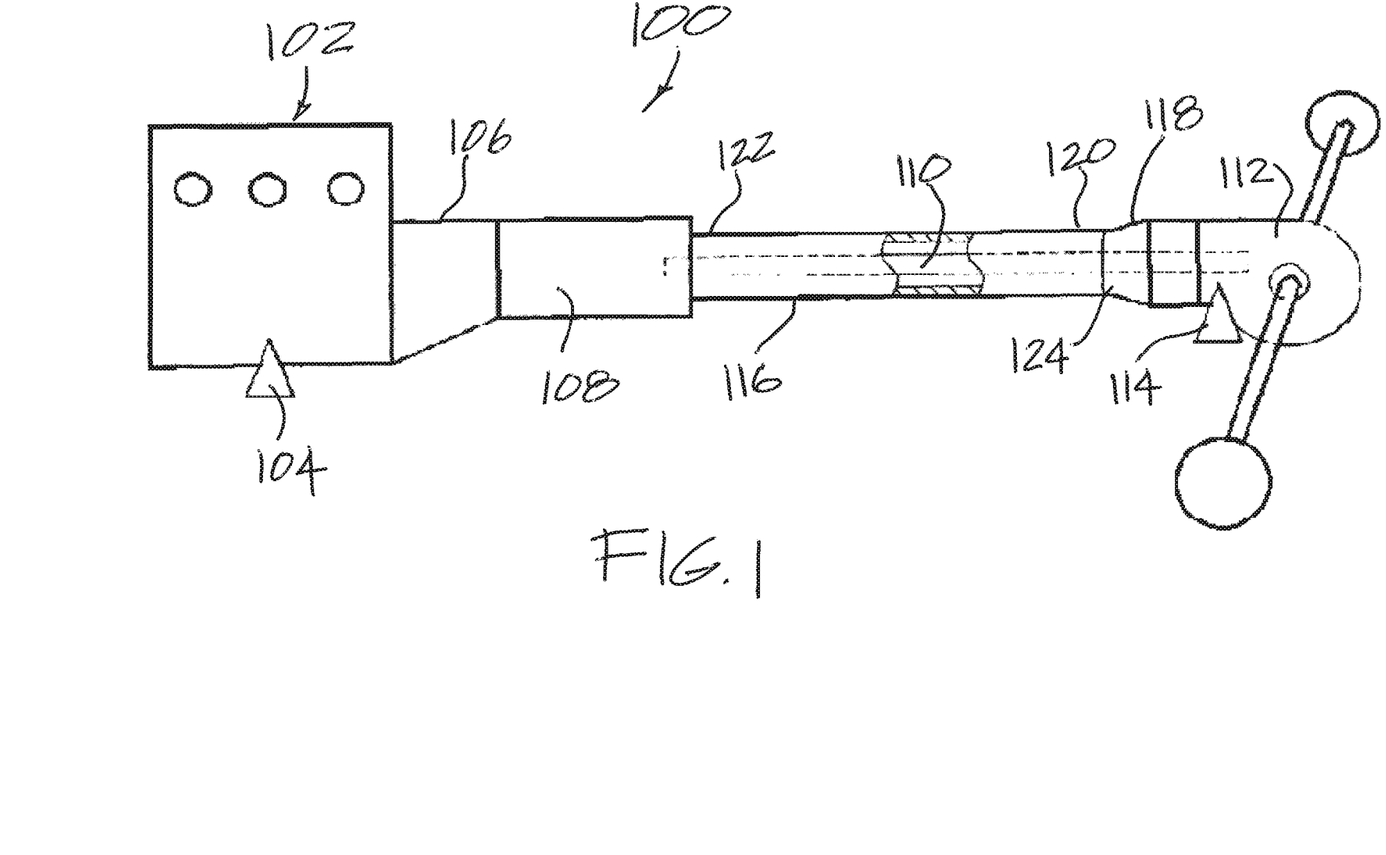
FIG. 1 is a schematic diagram depicting a drive train provided in accordance with aspects of the present disclosure.

With reference now to FIG. 1, a schematic diagram showing a drive train 100 for an automobile comprising an engine 102 supported on the frame at the front engine mount 104 is provided. A clutch unit 106 is attached to the engine 102 and to a transmission 108. To drive the rear wheels, a drive shaft 110 is provided for connecting the transmission to the rear differential gear unit 112, which is supported by the rear mount 114. A torque tube or shaft 116 is located externally of the drive shaft 110. The torque tube 116 is configured to get the traction forces generated by the wheels to the car frame. As shown, the torque tube 116 is made from a composite material, such as by filament winding around a mandrel, and is attachable to the bell housing 118 at its first end 120 and to the transmission housing at its second end 122. The connection at the first end 120, the second end 122, or both can include the innovative connection joint 124 provided in accordance with aspects of the present disclosure.

Figure 2:
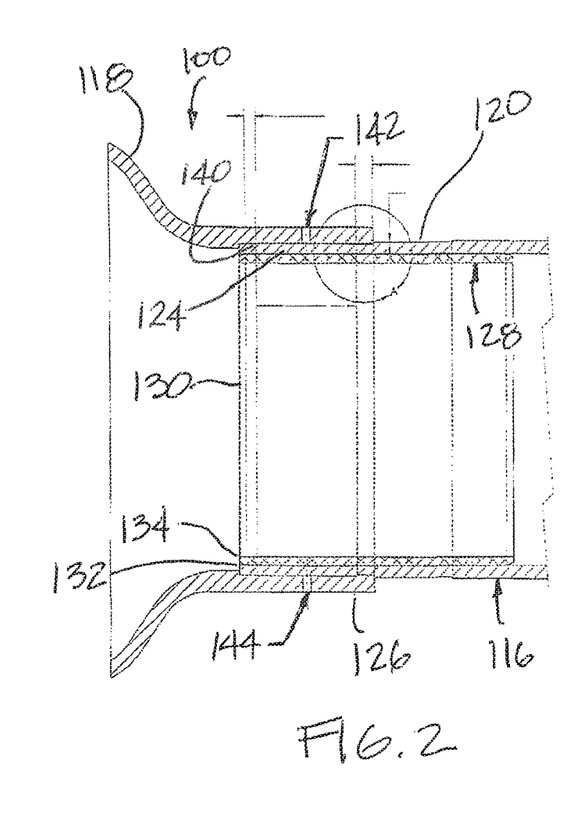
FIG. 2 is a partial cross-sectional side view of the drive train of FIG. 1, viewed at the first end of the torque tube.

FIG. 2 is a partial cross-sectional view of the drive train 100 of FIG. 1 and more specifically of the connection joint 124 at the first end 120 of the drive train. As shown, the bell housing 118 has an inlet 126 for receiving the torque tube 116. The inlet 126 may be referred to as a hub. In other examples, the bell housing 118 may embody any number of engine components that accepts or receives a shaft, such as a composite tube of the present disclosure. The torque tube 116 is made from a composite material, such as from a carbon fiber/epoxy combination, to contribute to the overall weight reduction of the drive train. To enhance the connection, an inner support tube 128 is pressed fit into the open end 130 of the composite tube 116 to support the composite tube 116, as further discussed below. In an embodiment, the support tube 128 is made from a metallic material, which in a preferred embodiment is aluminum.

In one example, the support tube 128 can have approximately the same thickness as the torque tube 116 but can be smaller or larger depending on the temperature, load and other operating parameters of the particular application. In an embodiment, the length of the support tube 128 is typically one (1) time the composite tube diameter. Thus, if the tube diameter is 3.3 inches, then the length of the support tube 128 is 3.3 inches. In another example, the length of the support tube 128 can be longer or shorter than the diameter of the composite tube 116. As shown, the support tube 128 is pressed fit into the open end 130 of the composite tube 116 and slid or forced into the composite tube until the end-most parts 132, 134 of the two tubes 116, 128, respectively, are generally flushed or even. In a less preferred embodiment, the end-most part 134 of the support tube 128 extends further into the bell housing 118 than the end-most part 132 of the composite tube 116. In yet another example, the end most part 134 of the inner support tube 128 resides completely inside the torque tube 116. The composite tube 116 can vary in length depending on the application. For example, the composite tube 116 can extend about 4 feet to 7 feet in length from the first end to the second end or even longer. Where the composite tube is used as a coupling or a pipe section, the range can be even greater, extending from about 1.5 feet to about 10 feet. Generally speaking, the longer the composite tube 116, the stiffer and stronger it is made, which generally includes a relatively thicker walled tube.

The support tube 128 is configured to prevent the composite tube 116 from creeping and/or to resist creeping when the composite tube is pressed fit into the engine bell housing 118. For example, when the inlet 126 of the bell housing squeezes the end 120 of the composite tube 116 due to the interference fit between the bell housing and the torque tube and the drive train 100 is at elevated temperatures, such as during service, the fibers of the torque tube can move or creep. Consequently, composite materials are seldom employed for certain automotive applications and at certain elevated temperatures. However, by supporting the first end 120 of the composite tube 116 with a support tube 128, it is possible to expand the use of composite materials for automotive and other applications, as further discussed below. Note that even when the service temperature is not elevated, the connection joint 124 using a support tube of the present disclosure may still be employed.

The second end 122 of the composite tube 116 (FIG. 1) may similarly be equipped with a support tube 128 (not shown) for press fitting the second end into the transaxle nose housing or transmission housing. In some embodiments, the composite tube 116 is first attached to a hub portion of a flange member (not shown). The flange member is then attached to a mating flange of the transaxle housing, the differential gear unit or the power transmission unit, and the mated flanges are bolted together. In embodiments with a flange member, the composite tube 116 may be attached to the hub portion of the flange member in the same manner or fashion as discussed herein for installing the composite tube into the hub of the bell housing 118, as further discussed below. In yet other examples, the composite tube 116 is attached to a hub portion that is then attached to a yoke. The yoke is then attached to a universal joint, which can be attached to an axle yoke or other rotating members, as further discussed below.

When aluminum is used for the support tube 128, the thermal expansion of the aluminum internal sleeve maintains a preload over and above the initial interference fit on the composite tube 116 as the engine bell housing and the transaxle housing temperatures increase during service or operation. In one example, the insertion amount of the composite tube 116 with its internal aluminum support sleeve 128 into the engine bell housing 118 and at the other end 122 to a transaxle nose or transmission housing (FIG. 1) is less than one (1) time the diameter of the composite tube 116 to prevent or minimize local stress concentrations at the connection. That is, the overlap between the bell housing 118 and the composite tube 116 is preferably less than the diameter of the composite tube to prevent or minimize local stress concentration around the end of the composite tube caused by the press-fit arrangement. In a particular example, the overlap between the bell housing and the composite tube is about 20% to 90% of the diameter of the composite tube while the overlap between the support tube 128 and the composite tube 116 is about 85% to 125% of the diameter of the support tube, with the latter figure for a support tube that is longer in length than the diameter of the composite tube. Less preferably, the composite tube 116 can be inserted a distance into the inlet 126 of the bell housing 118 that is approximately between 0.9 to 1.2 times that of the tube diameter.

Figure 3:
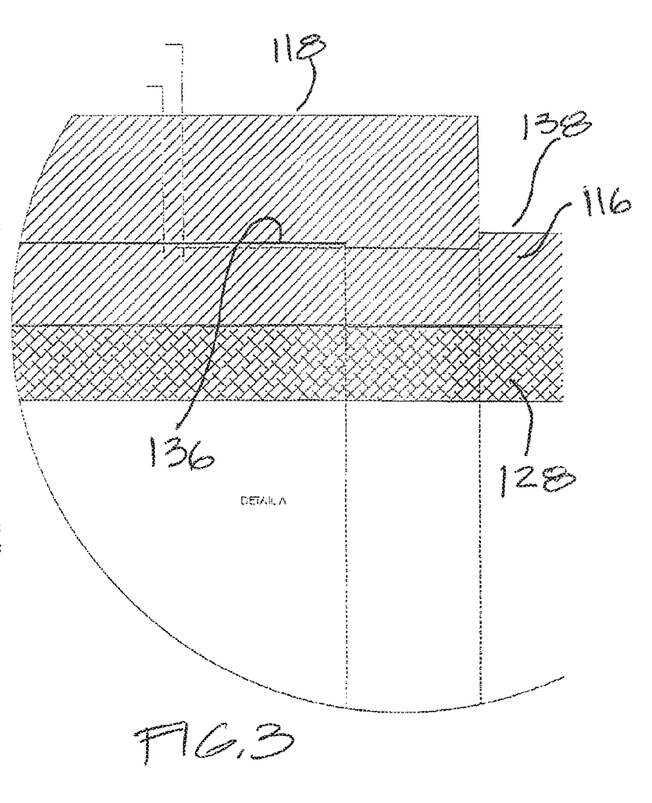
FIG. 3 is a blown up view of detail A of FIG. 2.

With particular reference to FIG. 3, the composite tube 116 has a clean-up machining cut 136 on the outside surface or area 138 that is inserted into the bell housing 118, and a similar cut on the opposite end 122 for insertion into the transaxle housing, hub portion, differential gear unit or transmission unit, to achieve a desired interference fit. The clean-up cut 138 simply creates a precision machined surface to provide a desired interference fit. In an example, the interference is roughly 0.005 inches to about 0.012 inches with 0.008 inches being more common. Even though a clean-up machining cut is applied to the outside surface of the composite tube, the structural fibers extend into the over-lap joint.

To further enhance the connection joint 124 between the bell housing 118 and the composite tube 116, and on the other end 122 of the composite tube with a second end structure that the second end connects to, a recess or undercut 140 is provided on the inside surface of the inlet or hub 126 of the bell housing 118. In one example, the recess or undercut 140 embodies a relief machined in the inside surface of the bell housing 118, and of the second end structure for the second end 122 of the composite tube, to provide space for epoxy adhesive. For example, when epoxy is added to the joint to secure the two components, a tiny space is provided by the undercut 140 to facilitate distribution of the adhesive. In one example, the undercut 140 is formed circumferentially around the inlet 126 of the bell housing to a depth of about 0.005 inches to about 0.040 inches. In alternative embodiments, spiral grooves are formed as undercuts for adhesive flow. In still yet other embodiments, spaced apart axial grooves are formed as undercuts with channels or gaps formed between them for fluid adhesive distribution.

An assembly hole 142 is provided in the bell housing 118 to allow epoxy adhesive to be injected into the connection joint 124, and more particularly to the undercut section or sections 140 of the inlet 126. A zerk fitting or similar fitting may be used with the assembly hole 120 to inject epoxy adhesive into the undercut section or sections 140. In an alternative embodiment, two or more holes with two or more fittings are used to inject the epoxy adhesive. Excess adhesive can drain out a drain hole 144 located some distance from the assembly hole 142. In a preferred embodiment, the second hole or drain hole 144 is located opposite the assembly hole. The adhesive is pressurized in the joint or recessed space 140 and completely fills the relief space. Without the undercut, it may not be possible to apply adhesive to the parts before slipping them together as adhesive can scrape off during the fit-up process. This relief is approximately 60% of the overall insertion length of the joint. For example, if the overlap length between the bell housing and the composite tube is 2 inches long, then the relief is about 1.2 inches in axial length. In other examples, the relief can be greater than 60% and as low as about 30%. Once connected, the composite tube 116 is understood to be mounted to two hubs or inlets 126, which in the present embodiment are secured to stationary housing structures, such as part of a bell housing and part of a transmission housing.

As understood by the present disclosure, several varied approaches are combined to produce a reliable and cost effective connection joint. First, the composite tube 116 is inserted into the bell housing 118 and the second end 122 is inserted into the second end structure with an interference fit at both ends. Second, deformation or "creep" of the composite tube 116, which normally would result in compromising the strength of the interference fit, is addressed by the support tube 128 that is positioned on the inside of the composite tube 116 to resist creep deformation caused by the interference fit with the bell housing 118. The composite tube 116 is sandwiched between the bell housing 118 and the support tube 128, which are both preferably made from metallic materials with each having an interference fit on the inside diameter and the outside diameter of the composite tube, respectively.

A similar configuration but with a different second end structure is arranged on the second end 122 of the composite tube 116. In an alternative embodiment, the second end 122 of the support tube is bonded to another composite structure but without a support tube, such as for when creep is not an issue at the second end 122. Further alternatively, the second end is inserted into a slip-on flange or a hub with a bolted connection to a second end structure. After assembly, epoxy adhesive is injected into the mated joints provided by a recessed space or undercut machined into the bell housing and into the second end structure. The recessed space 140 is filled and is allowed to cure. This joint 124 is self-fixturing by virtue of the interference fit so no adhesive bonding fixtures, such as clamps or support rigging, are required to hold the components together during curing and the parts can be moved down the assembly line while curing. The adhesive bond supplements the press-fit arrangement to resist bending stresses from axle torque which may not be carried as well by a press-fit connection alone. The adhesive bond is configured to carry the high bending and torque loads typically associated with torque or load bearing shafts. The composite tube 116 expands into the relief gap or undercut after being pressed fit into the bell housing 118, which increases the strength of the press-fit and reduces the bond line gap. The combination of the three elements of the joint design 124 make for a robust connection that is low cost to produce and suitable for high volume production.

In some embodiments, the location of the support tube 128 is modified. For example, the support tube 128 may be placed around the exterior, such as pressed fit over the OD, of the composite tube 116. To mount the modified reinforced shaft with the support tube 128 on the outside, the hub, such as the bell housing 118 of FIG. 2, is pressed fit to the interior surface, such as pressed fit to the ID, of the support tube 116. Similar overlapping and interference may be used as described above for the reversed arrangement. When the support tube is mounted to the outside of the composite tube, a fill hole 142 and a drain hole 144 may be incorporated in the support tube.

Figure 4:
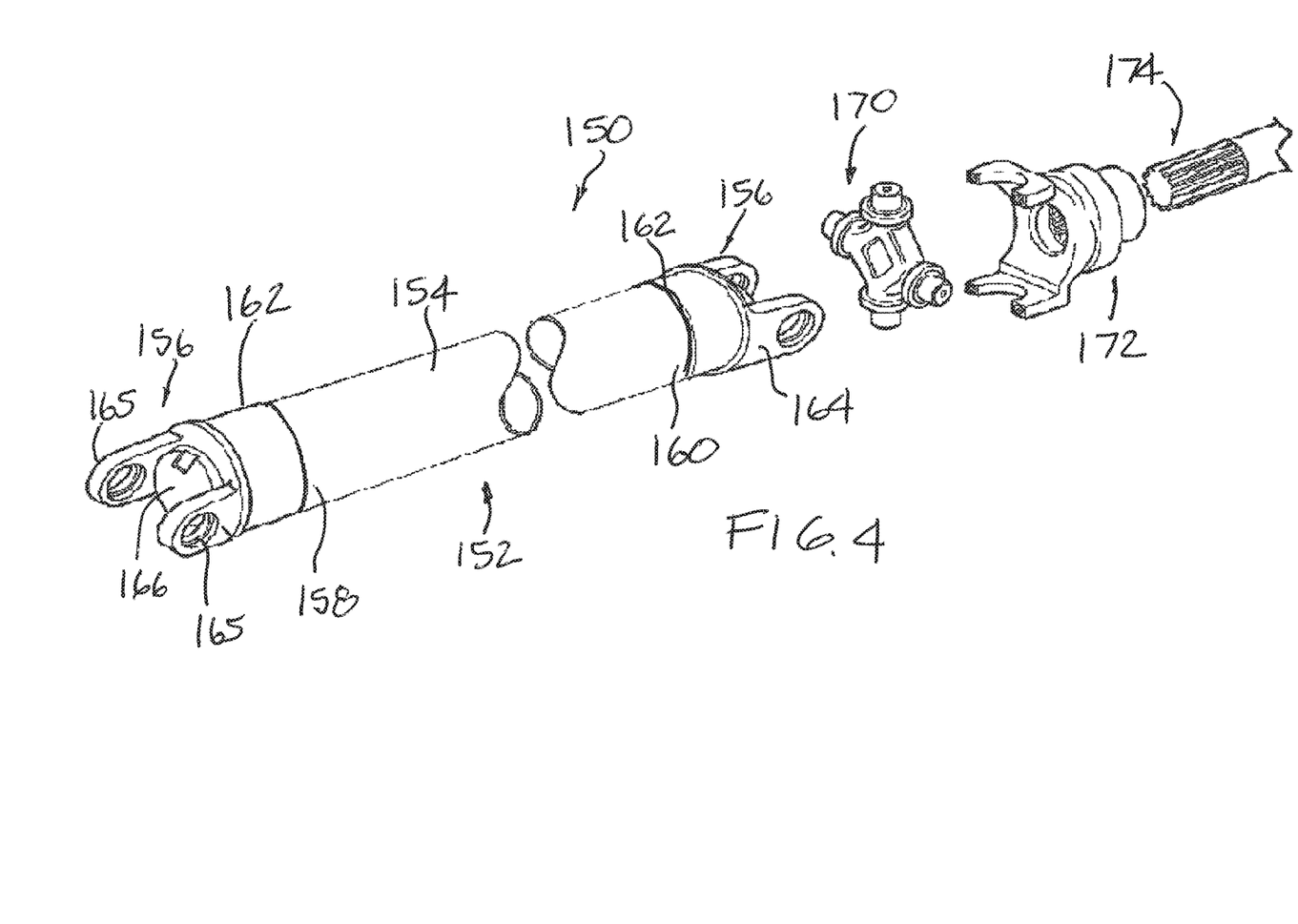
FIG. 4 is a schematic view of a drive shaft assembly provided in accordance with aspects of the present disclosure.

With reference now to FIG. 4, a drive shaft assembly 150 provided in accordance with another aspect of the present system, device and method is shown. The drive shaft assembly 150 comprises a tube assembly 152 comprising a torque tube 154 having a slip on yoke 156 located at the first end 158 and the second end 160 of the torque tube 154. The yoke 156 each comprises a hub 162 and a connection flange 164 comprising two connection bosses 165 and is typically made from a metal, such as carbon steel. The hub 162 is hollow and a bore defined by the wall surfaces of the hub extend towards the end wall 166 of the connection flange 164.

As shown, the torque tube 154 is made from a composite material, such as by a filament winding process similar to the process described above for the composite tube 116. The tube 154 may be attached to the two hubs 162 using the process described above for connecting the composite tube 116 to the bell housing 118. The torque tube 154 is configured for rotatable applications. Thus, the tube assembly 152 further comprises two metallic support tubes (not shown) mounted internally at each end 158, 160 of the torque tube 154 and pressed-fit to the torque tube. The drive shaft assembly 150 further comprises a universal joint 170, an axle yoke 172, and a driver or driven shaft 174, which is connected to the axle yoke. The drive shaft assembly 150 may be part of any number of automotive drive train systems from any number of automobile manufacturers.

As described, aspects of the present disclosure are understood to include a device, system, and method comprising a composite shaft or tube connected to a hub at each end of the tube. The device, system and method are further understood to include a flange for use in a rotatable application. In an alternative embodiment, the two hubs are connected to or are part of stationary housings for use in a stationary application. As shown in FIG. 4, the two flanges are part of a yoke assembly. In other embodiments, the flanges have a generally planar bolt pattern for bolting to a mating flange having a similar bolting pattern. The alternative configuration with a bolt pattern is typically found in pipe lines and in shaft couplings, among other applications, and resembles the assembly shown in FIG. 5.

Figure 5:
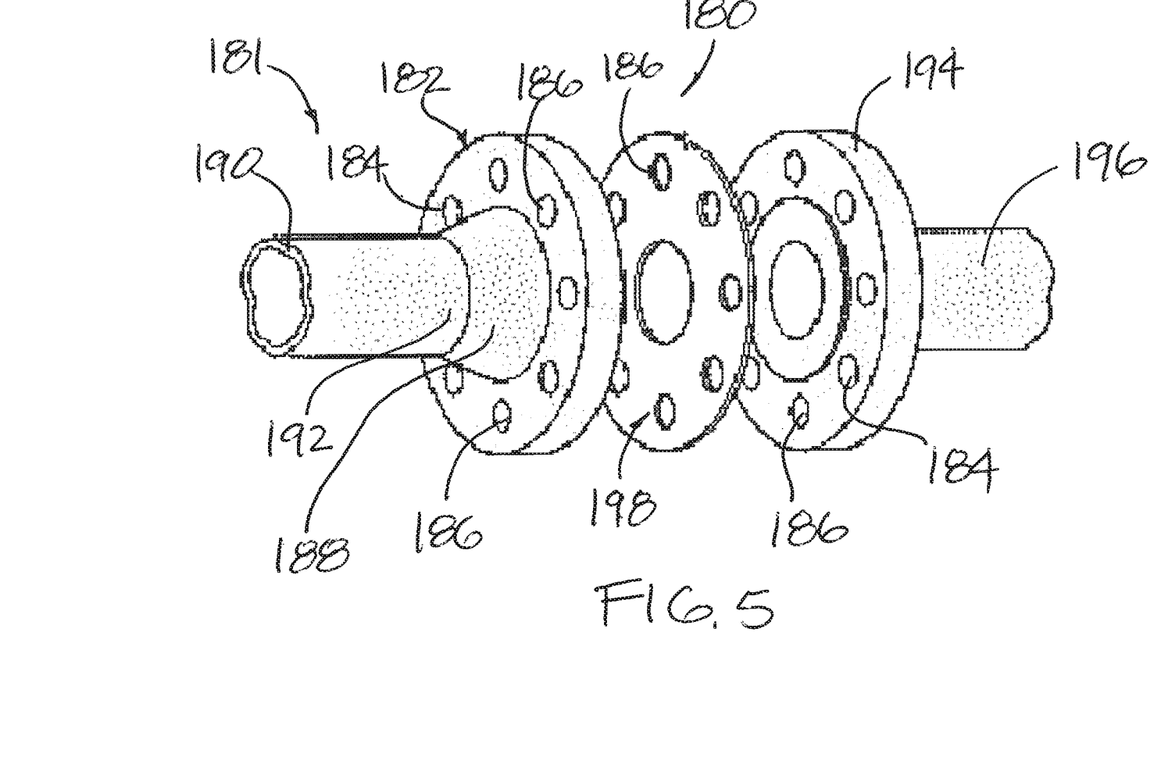
FIG. 5 is a connection system provided in accordance with aspects of the present disclosure.

With reference now to FIG. 5, a connection system 180 provided in accordance with aspects of the present disclosure is shown. The connection system 180 comprises a shaft piece 181 comprising a flange 182 comprising a bolt pattern 184 with a plurality of bolt holes 186. A hub 188 is attached to the flange 182, which defines a bore for receiving a pipe, shaft, or tube 190. In the disclosed embodiment, the tube 190 is made from a composite material, such as by a filament winding process, similar to the process described above for the composite tube 116. The tube 190 may be attached to the hub 188 using the same process described above for connecting the composite tube 116 to the bell housing 118. Thus, the shaft piece 181 further comprises a support tube (not shown) mounted internally in a press-fit configuration at the first end 192 to resist and/or prevent creep. The second end (not shown) of the shaft piece 181 may be connected to a similar hub and flange as shown in FIG. 5. In an alternative embodiment, the flange at the second end may have a different flange type with a different flange pattern. The shaft piece 181 is configured for rotatable, stationary load and torque bearing, or rotatable load and torque bearing applications.

The connection system 180 further comprises a flange 194 having a bolt pattern 184 and a plurality of bolt holes 186. A shaft 196 extends from the flange 194. The flange 194 is configured to be mated to the flange 182 on the shaft piece 181, preferably with a gasket 198 having a matching bolt pattern 184. In one exemplary embodiment, the shaft 196 is part of a fluid delivery system. In another example, the shaft 196 is part of a rotatable drive or driven system. For example, the shaft 196 can be part of a gear box, a motor, a turbine or a compressor. If the shaft 196 is part of a system to be driven, such as a gear box or a driven system for a fan assembly, then the shaft piece 181 is understood to be connected at its second end (not shown) to a driver equipment, such as a motor. Alternatively, the shaft piece 181 may be connected to an output speed reducing end of a gear box.

Figure 6:
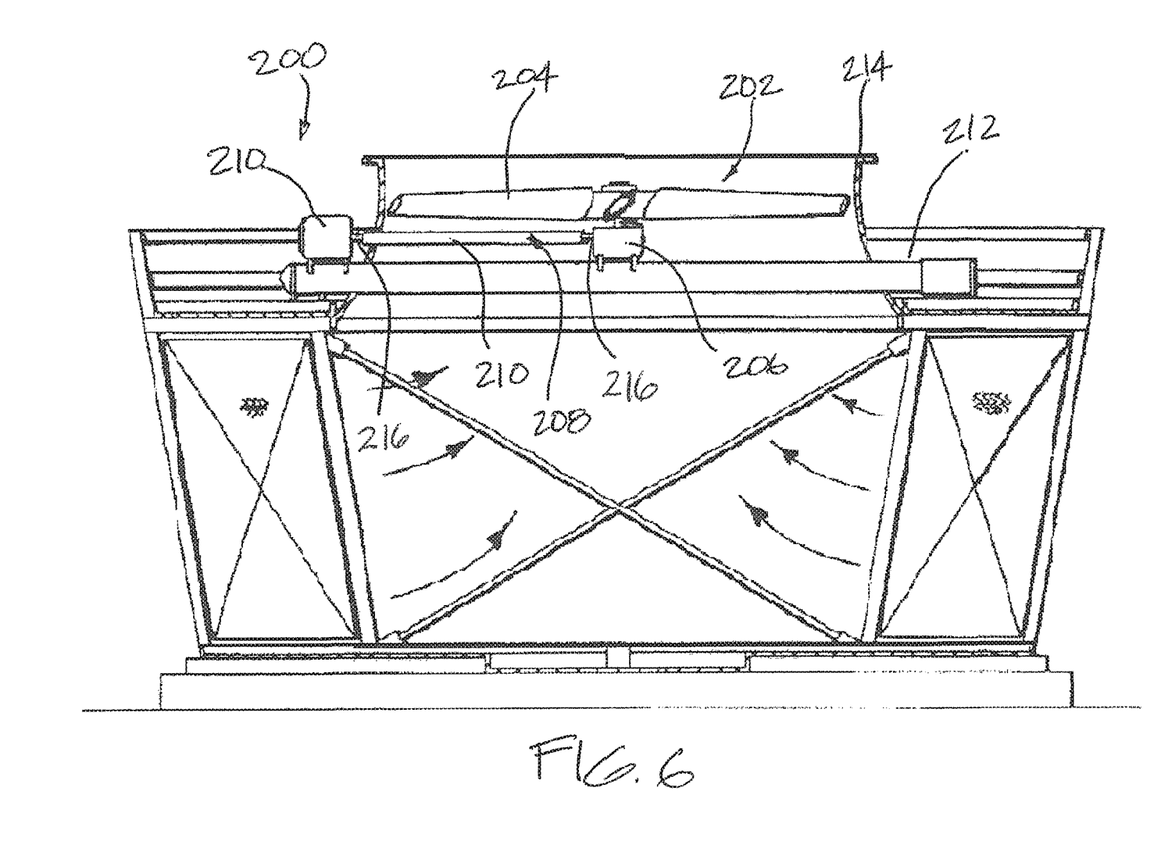
FIG. 6 is a cooling tower comprising a fan assembly provided in accordance with aspects of the present disclosure.

FIG. 6 is a schematic cross-section end view of a cooling tower 200 provided in accordance with aspect of the present disclosure. The cooling tower 200 comprises a fan assembly 202 comprising a plurality of fan blades 204 driven by an angled fan drive unit or box 206, which is connected to a drive shaft 208 and which in turn is connected to a fan motor 210. The fan assembly 202 is connected to an upper deck 212 of the cooling tower 200 and is configured to draw hot air away from the cooling tower out through the shroud 214. In one example, the drive shaft 208 is similarly formed and structured as the shaft piece 181 of FIG. 5. In other words, the drive shaft 208 comprises a composite tube 210 connected at each end to a hub 216, which is connected to a flange. The connection between the tube 210 and the hub 216 at each end may be the same as described above for the torque tube 116 of FIGS. 1-3. Thus, the drive shaft 208 is understood to include a support tube (not shown), such as an aluminum support tube, pressed fit into each end of the composite tube 210. In an alternative embodiment, the drive shaft 208 is connected directly to the fan shaft and the drive shaft is driven by a belt, which is connected to a drive shaft of a motor.

The present disclosure is therefore understood to include a shaft piece that is made from a high strength fiber/epoxy composite material having a length with two open ends, a diameter, and a wall thickness. When used in combination with a metallic structure, such as when connecting to a hub of the metallic structure, a metallic support tube is first pressed fit into one of the ends of the composite tube with an interference fit. In one example, the total interference is about 0.005 to about 0.012 inches with 0.008 being more common. In other examples, the interference amount can vary. The metallic support tube is preferably made from an aluminum material although stainless steel, carbon steel, and other metallic materials are also contemplated. The intermediate product consisting of an outer composite tube and an inner metallic support tube with an interference fit, which may be referred to as a reinforced composite tube, is then pressed fit into a metallic hub with an interference fit between the metallic hub and the reinforced composite tube. The total interference with the metallic hub can also be between 0.005 to 0.012 inches with other interference range contemplated. The composite tube is thus sandwiched between two metallic interfaces with an interference pre-load on an inside surface of the composite tube and on an outside surface of the composite tube. The sandwiched composite tube may herein be referred to as a reinforced shaft piece.

As disclosed herein, the overlap between the hub and the composite tube is about 20% to 90% of the outer diameter of the composite tube while the overlap between the support tube and the composite tube is about 85% to 125% of the outside diameter of the support tube. The sandwiched composite tube or reinforced shaft piece may further include a machined surface to control the press-fit arrangement between the hub and the composite tube, an undercut in the hub to accommodate adhesive flow, a fill hole and a drain hole for applying the adhesive.

The reinforced shaft piece may be used in a number of load and/or torque bearing static or dynamic applications. As disclosed, the reinforced shaft may be used in automobile applications, in piping applications, in coupling applications, in cooling tower applications, etc. The use can vary by changing the attachment type for the hub. For example, the hub can be part of a flange with a bolt pattern for bolting to a mating flange, part of a yoke for mating with a universal joint, or part of a housing that attaches to another housing section. Also contemplated is a hub that has a male or female threaded end to convert the reinforced shaft piece into a threaded shaft.

Although limited embodiments of composite tube for torque and/or load transmissions and their components have been specifically described and illustrated herein, many modifications and variations will be apparent to those skilled in the art. For example, the various hubs connected to the disclosed composite tube may be connected to any number of flanges, housings, and structures and not necessarily limited to the specific examples described herein. Also, while exemplary ranges for overlapping and interference fit have been provided, other ranges are contemplated depending on the scale, size, material, and application, among others. Furthermore, it is understood and contemplated that features specifically discussed for one composite tube for torque and/or load transmissions may be adopted for inclusion with another provided the functions are compatible. Accordingly, it is to be understood that the composite tube for torque and/or load transmissions and their components constructed according to principles of the disclosed device, system, and method may be embodied other than as specifically described herein. The disclosure is also defined in the following claims.

What is claimed is:

1. A shaft piece, said shaft piece comprising:
   a composite tube comprising a body with a length, a hollow interior, and an open end;
   a metallic sleeve pressed fit into the open end in an interference fit;
   an outer metallic cylinder having the open end of the composite tube with the metallic sleeve located therein in a pressed fit arrangement;
   wherein the composite tube is sandwiched between the metallic sleeve and the outer metallic cylinder and pre-loaded on an inside surface of the composite tube and on an outside surface of the composite tube.

2. The shaft piece of claim 1, wherein the metallic sleeve is made from aluminum.

3. The shaft piece of claim 1, wherein the outer metallic cylinder and the composite tube are adhesively bonded together.

4. The shaft piece of claim 1, wherein the outer metallic cylinder is a hub connected to a flange comprising a bolt pattern.

5. The shaft piece of claim 1, wherein the outer metallic cylinder is part of a slip on yoke comprising at least two connecting bosses.

6. The shaft piece of claim 1, wherein the outer metallic cylinder is part of a bell housing of an automobile drive train.

7. The shaft piece of claim 1, wherein the outer metallic cylinder is part of a gear box.

8. The shaft piece of claim 1, wherein the outer metallic cylinder is connected to a flange, which is connected to a fan assembly.

9. A method for forming a shaft piece comprising:
   forming a composite tube comprising a first end and a second end; said first end comprising a bore, an exterior surface, and an interior surface;
   placing a support tube into the bore of the first end in a press-fit arrangement; and
   placing the composite tube with the support tube into a bore of a metallic structure in a press-fit arrangement with the metallic structure; and
   wherein the composite tube is inserted into the bore of the metallic structure to form an overlap between the metallic structure and the composite tube that is at least 20% of a diameter of the composite tube.

10. The method of claim 9, further comprising machining an undercut in the bore of the metallic structure prior to placing the composite tube therein.

11. The method of claim 9, wherein the overlap between the metallic structure and the composite tube that is about 25% to about 90% of the diameter of the composite tube.

12. The method of claim 9, further comprising pressuring adhesive through a hole formed in the bore of the metallic structure.

13. The method of claim 9, wherein the support tube is made from an aluminum material.

14. The method of claim 9, further comprising aligning an end most part of the support tube with an end most part of the first end.

15. The method of claim 9, wherein the metallic structure is a hub connected to a flange comprising a bolt pattern.

16. The method of claim 9, wherein the metallic structure is part of a slip on yoke comprising at least two connecting bosses.

17. The method of claim 9, wherein the metallic structure is part of a bell housing of an automobile drive train.

18. The method of claim 9, wherein the metallic structure is part of a gear box.

19. The method of claim 9, wherein the metallic structure is connected to a flange, which is connected to a fan assembly.

* * * * *